May 2, 1967   R. F. CRANE, JR   3,316,734
APPARATUS FOR COOLING CANNED LIQUIDS
Filed April 12, 1966   3 Sheets-Sheet 1

Roland F. Crane, Jr.
INVENTOR.

BY *Clarence A. O'Brien*
and *Harvey B. Jacobson*
Attorneys

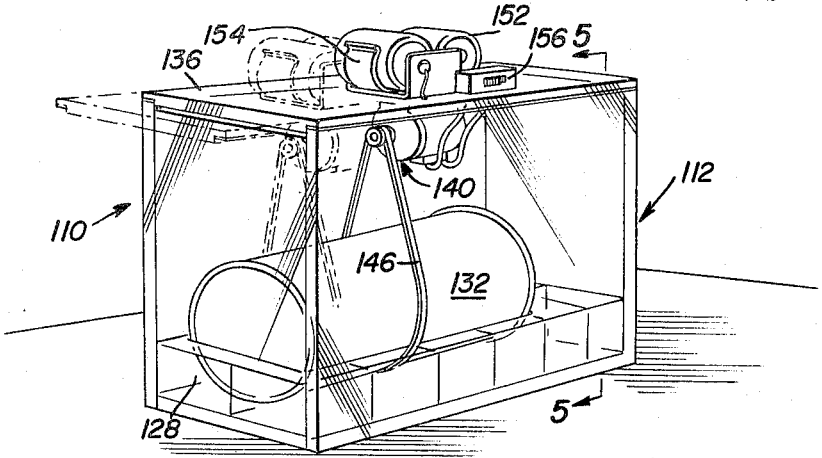
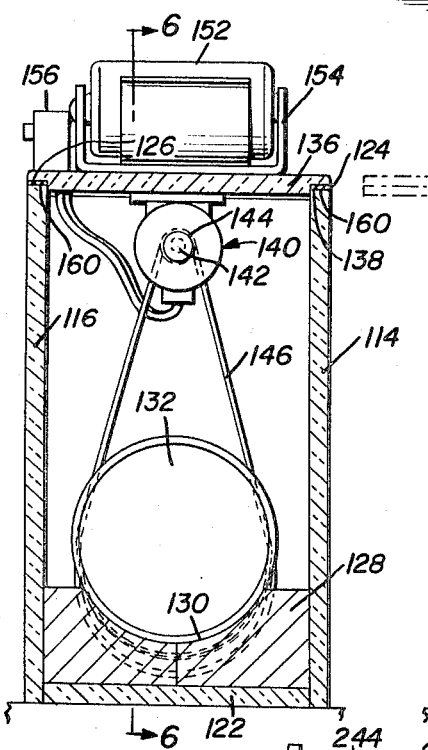
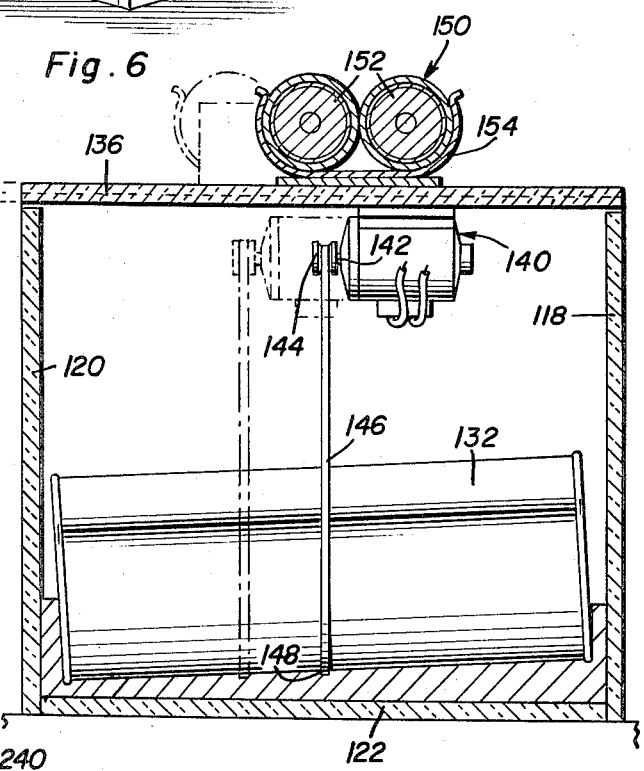
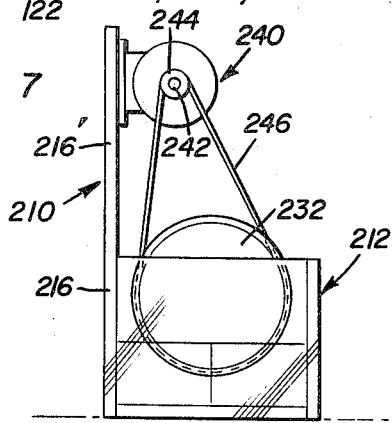

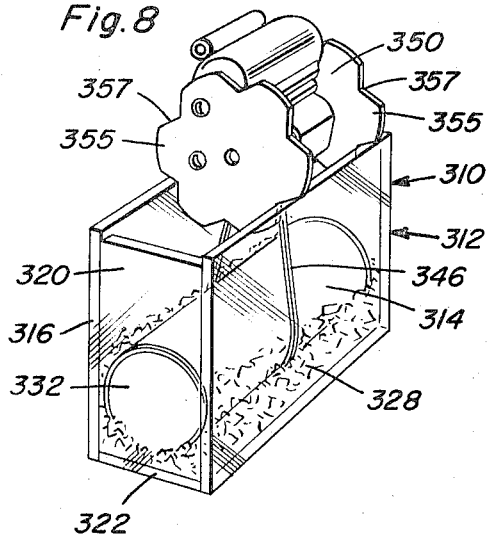
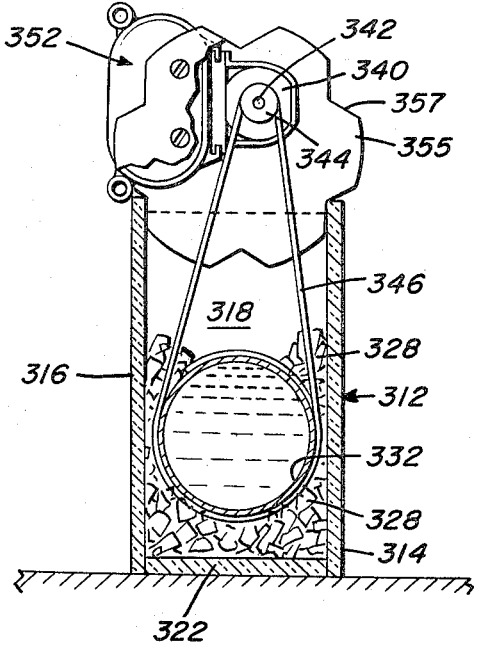
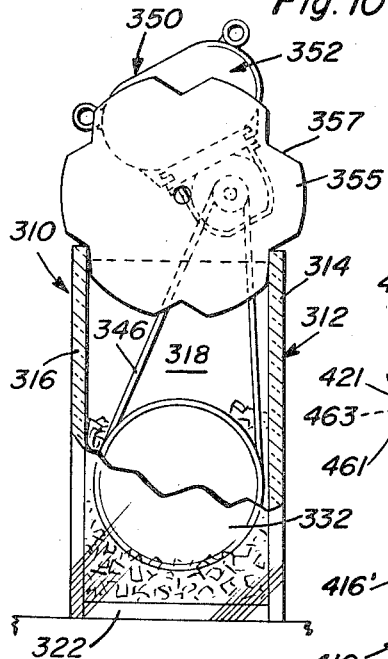
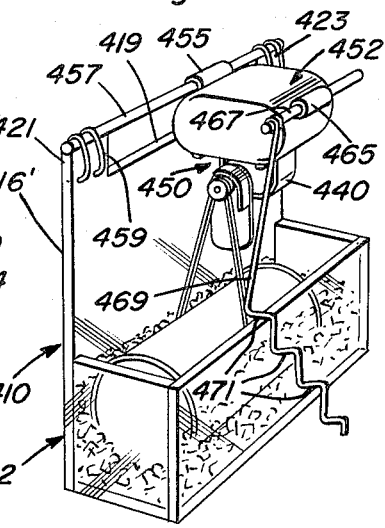

United States Patent Office 3,316,734
Patented May 2, 1967

3,316,734
APPARATUS FOR COOLING CANNED LIQUIDS
Roland F. Crane, Jr., Rte. 2, Box 425,
Pueblo, Colo. 81004
Filed Apr. 12, 1966, Ser. No. 544,663
26 Claims. (Cl. 62—381)

This is a continuation-in-part of application U.S. Ser. No. 442,372, filed Mar. 24, 1965, for Apparatus for Rapidly Cooling Canned Liquids, now abandoned.

This invention relates to a novel and useful apparatus which may be utilized to rapidly cool canned liquids such as beer or soft drinks. The apparatus of the instant invention includes a base which may be supported from any suitable supporting surface and which includes means adapted to stationarily support a quantity of ice.

One form of the invention includes means for supporting the aforementioned quantity of ice in an elevated position and a pair of guide means supported from the base on opposite sides of and in generally horizontally aligned positions with the means of the instant invention adapted to support a quantity of ice. A powered drive wheel is journalled from the base for rotation about a generally horizontal axis extending at generally right angles to a line passing between the guide means and an elastic endless and flexible drive member is entrained about the drive wheel and is guidingly engaged by the guide means. The elastic drive member is of sufficient length to pass over a quantity of ice supported from the base as well as a generally horizontally disposed and cylindrical container cradled in and journalled by the ice. In this manner, the powered drive wheel may be rotated so as to effect rotation of the cylindrical container journalled by the ice resulting in any fluent material disposed within the container being rapidly cooled especially if the container is constructed of a material which readily conducts heat.

Another form of the invention disclosed herein also includes a base to be supported from any suitable supporting surface and means adapted to stationarily support a quantity of ice upon which a cylindrical container is journalled. However, this latter form of the invention includes means rotatably journalling a power drive wheel about an axis disposed above the support means for the ice and is adapted to have one portion of an elastic endless flexible drive member entrained thereover with a remote portion of the drive member passing beneath the cylindrical container in a slightly tensioned state. This latter form of the invention therefore requires no guide means other than the container and the powered drive wheel for providing an operative device.

It is well known that a generally cylindrical container of liquid may be rapidly cooled by oscillating the container back and forth about its longitudinal axis while the container is disposed in a bucket of ice. This practice is of course commonly used to quickly chill bottles of champagne in restaurants and the like but the apparatus of the instant invention has been designed for ease of operation in the home and for even more quickly and efficiently cooling a container of liquid, the motor means of the apparatus of the instant invention being capable of spinning the contaner which is to be cooled at a higher rate of speed than that which could be done manually.

The main object of this invention is to provide an apparatus adapted for use in the home and other similar environments such as offices, restaurants and delicatessens which may be utilized to rapidly cool generally cylindrical containers of liquid and which will therefore provide a means whereby a liquid such as a drink which is not used often may be rapidly cooled. By this method, the necessity of maintaining a constant supply of various types of not too frequently used liquids refrigerated at all times so that these infrequently used liquids may be served instantly is eliminated.

Another object of this invention, in accordance with the immediately preceding object, is to provide an apparatus capable of rapidly rotating a generally cylindrical container of liquid about its longitudinal axis while the container is cradled and thus journalled in ice.

Yet another object of this invention is to provide an apparatus in accordance with the preceding objects that includes structural features readily adaptable to be manufactured in various sizes thereby enabling the apparatus to be constructed so as to conform to containers of various sizes.

A final object of this invention to be specifically enumerated herein is to provide an apparatus in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of a modified form of the invention illustrated operatively associated with a cylindrical container to be rapidly rotated while cradled in a quantity of ice;

FIGURE 5 is an enlarged transverse vertical sectional view taken substantially upon the plane indicated by the section line 5—5 of FIGURE 4;

FIGURE 6 is a vertical sectional view taken substantially upon the plane indicated by the section line 6—6 of FIGURE 5 and with an alternate position of the motor supporting portion of the apparatus illustrated in phantom lines;

FIGURE 7 is an end elevational view of still another modified form of the invention;

FIGURE 8 is a perspective view of yet another modified form of the invention utilizing motor support means operable to variably vertically adjust the axis of rotation of the drive shaft of the motor means whereby the endless flexible and resilient drive member may be properly tensioned as desired;

FIGURE 9 is an enlarged transverse vertical sectional view taken substantially upon a plane passing through the center of the apparatus illustrated in FIGURE 8 and with portions of the motor support means being broken away;

FIGURE 10 is an end elevational view of the embodiment illustrated in FIGURE 9 and with portions of the container broken away and the motor means of the apparatus supported at a different elevation relative to the container;

FIGURE 11 is a perspective view of a still further modified form of the invention;

FIGURE 12 is an end elevational view of the embodiment illustrated in FIGURE 11 and with portions of the container being broken away and illustrated in transverse vertical section; and FIGURE 13 is an enlarged fragmentary vertical sectional view taken substantially upon the plane indicated by the section line 13—13 of FIGURE 12.

Figure 1:
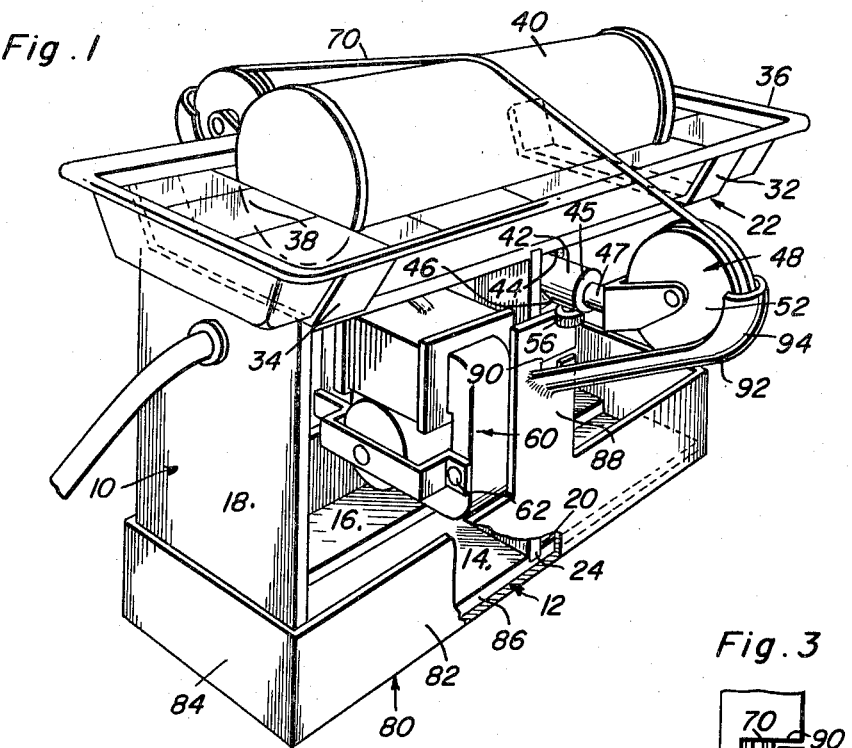
FIGURE 1 is a perspective view of the apparatus of the instant invention shown operatively supporting an open top tray of ice, the endless flexible drive member of the apparatus being operatively associated with a cylindrical can of liquid cradled in the ice tray for causing the can to be rotated at high speeds.
Figure 3:
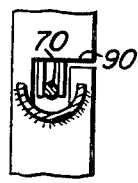
FIGURE 3 is an enlarged fragmentary vertical sectional view taken along the plane indicated by the section line 3—3 of FIGURE 2.

Referring now more specifically to the drawings, the numeral 10 generally designates the apparatus of the instant invention. The apparatus 10 includes a base generally referred to by the reference numeral 12 and defined by a pair of longitudinal members 14 and 16. A pair of uprights 18 and 20 have their lower ends connected between the longitudinal members 14 and 16 at points spaced longitudinally therealong and are secured to and support means generally referred to by the reference numeral 22 in an elevated position above the base 12.

The upright 18 comprises a single panel-like member and the upright 20 comprises a pair of upstanding strips 24 and 26. The support means 22 is defined by a pair of longitudinally extending upper support members 28 and 30 and a pair of shallow generally U-shaped cradle members 32 and 34 which are secured to opposite pairs of corresponding ends of the upper longitudinal support members 28 and 30 in any convenient manner.

As can best be seen from FIGURE 1 of the drawings, the configuration of the cradle members 32 and 34 is such that a conventional refrigerator tray or ice tray 36 may be snugly cradled and supported thereby. The tray 36 has a plurality of separated ice cubes 38 disposed therein and a generally cylindrical can 40 containing liquid is cradled in a complementary recess melted in the ice cubes 38, the ice cubes 38 being replaceable by crushed ice.

Figure 2:
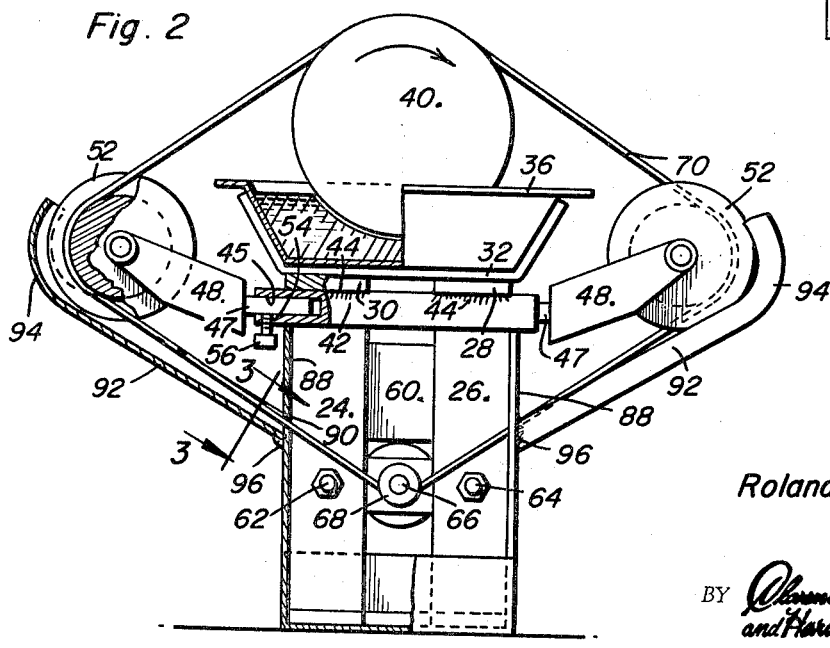
FIGURE 2 is an end elevational view of the apparatus illustrated in FIGURE 1 and is seen from the right side of FIGURE 1 and with parts of the apparatus and ice tray broken away and shown in transverse vertical section.

With attention invited now to FIGURE 2 of the drawings, it may be seen that a generally cylindrical brace 42 is secured to the undersurfaces of the upper longitudinal members 28 and 30 in any convenient manner such as by welding 44 and to the faces of the strips 24 and 26 remote from the upright 18 in any convenient manner such as by welding 46. The opposite ends of the axially extending blind bores 45 and the cylindrical shank portions 47 of a pair of castor wheel assemblies generally referred to by the reference numeral 48 are rotatably and seatingly received in the blind bores 45. The castor wheel assemblies each include a grooved guide wheel 52 and one end of the brace 42 is provided with a transverse bore 54 opening into the corresponding bore 45 and having a setscrew 56 threadedly engaged therein. The setscrew 56 is provided to maintain the shank portion 47 of the corresponding castor wheel assembly 48 in the desired position. However, the shank portion of the other castor wheel assembly 48 may be allowed to oscillate if desired in order that the latter may automatically align itself with the drive member 70, thus avoiding the tendency of the drive member to jump out of the groove of the corresponding guide wheel 52 when the can 40 is not positioned so as to parallel the drive shaft 66.

An electric motor generally referred to by the reference numeral 60 is secured to the strips 24 and 26 by means of fasteners 62 and 64 and includes a drive shaft 66 on which there is mounted a flanged drive wheel 68. An endless flexible and elastic drive member 70 is entrained about the drive wheel 68 and the guide wheels 52 of the castor wheel assemblies 48. The drive member 70 also passes over the can 40 and is disposed in driving frictional engagement therewith so that when the motor 60 is actuated and the drive shaft 66 is rotated at high speeds, the endless drive member 70 will cause the can 40 to be spun rapidly about its longitudinal axis while cradled in the ice cubes 38. This rapid spinning of the can 40 will of course have an effect of maintaining the entire outer surfaces of the cylindrical portion of the can 40 in constant contact with ice. In addition, rotation of the can 40 will also cause turbulence of the liquid within the can and therefore rapidly cool the liquid down to a point just above the temperature of the ice within a short period of time.

The apparatus 10 also includes means for preventing ice water carried by the elastic drive member from being thrown outwardly of the apparatus 10 and onto any surface upon which the apparatus 10 is supported.

The apparatus 10 includes an upwardly opening shallow tray generally referred to by the reference numeral 80 and including interconnected opposite side and end walls 82 and 84. The lower edge portions of the opposite side and end walls 82 and 84 are interconnected by means of a bottom wall 86 and the base 12 of the apparatus 10 is snugly received within the tray 80.

The side walls 82 of the tray 80 each include upstanding portions 88 which are formed integrally with the side walls 82 and secured to the upright 20. Each of the portions or extensions 88 includes a keyhole slot 90 for receiving the corresponding portion of the elastic drive member 70 therethrough and the lower extremity of each keyhole slot 90 is embraced by a corresponding upwardly and outwardly extending and inclined gutter or trough 92 which closely underlies the corresponding reach of the elastic drive member 70. The outer ends of the trough 92 are curved upwardly as at 94 so as to embracingly receive the corresponding guide wheel 52. The trough 92 may be secured to the corresponding extensions 88 in any convenient manner such as by welding 96 and it may be readily appreciated that as the elastic drive member 70 is driven at high speed by the flanged drive wheel 68 water clinging to the drive member 70 caused by its engagement with the damp can 40 will be partially spun from the drive member 70 as the latter passes around the right-hand guide wheel illustrated in FIGURE 2 of the drawings. An additional portion of the water clinging to the drive member 70 will be spun off as the latter passes around the flanged drive pulley 68 and still further portions of the water clinging to the drive member 70 will be spun therefrom as the drive member 70 passes about the flanged guide wheel 52 on the left hand side of the apparatus as illustrated in FIGURE 2 of the drawings. The trough 92 will of course collect the water that is spun from the drive member 70 as it passes about the guide wheels 52 and this collected water will be directed downwardly along the trough 92 and inwardly of the extensions 88 through the lower portions of the keyhole slot 90 formed in the extension 88. That portion of the water clinging to the drive member 70 which is spun due to the drive member 70 passing about the flanged or drive pulley 68 will of course be collected by the tray itself.

With attention now invited to FIGURES 4–6 of the drawings there may be seen a modified form of apparatus generally referred to by the reference numeral 110. The apparatus 110 includes a housing generally referred to by the reference numeral 112 having a pair of opposite side walls 114 and 116, a pair of opposite end walls 118 and 120, and a bottom wall 122 which interconnects the lower edge portions of the walls 114–120.

The upper marginal edge portions of the side walls 114 and 116 include extensions 124 and 126 which project above the upper edge portions of the end walls 118 and 120. A quantity of ice 128 is disposed within the housing 112 and rests upon the bottom wall 122. The ice 128 has an upwardly opening and generally partial cylindrical recess 130 formed therein in which the lower peripheral portions of a generally cylindrical can 132 is cradled. Of course, inasmuch as the ice 128 has a low coefficient of surface friction, the can 132 is supported on the ice 128 in a manner such that the can 132 may be readily rotated about its longitudinal axis.

A top or closure panel 136 is provided for the housing 112 and includes opposite longitudinal edge portions which are notched as at 138 to receive the extensions 124 and 126. In this manner the top panel or wall 136 may be shifted longitudinally of the housing 112 from the solid line position illustrated in FIGURE 6 of the drawings to the phantom line position thereof illustrated in FIGURE 6.

An electric motor generally referred to by the reference numeral 140 is dependingly supported from the top wall 136 and includes a power output or drive shaft 142 which generally parallels the longitudinal centerline of the container or can 132. A pulley or drive wheel 144 is mounted on the rotatable drive shaft 142 for rotation therewith and an endless flexible and elastic drive member 146 is entrained over the pulley 144 and under the container 132. Accordingly, upon rotation of the drive shaft 142 the container 132 will be caused to rotate within the recess 130 and in good heat transfer relation with the ice 128. Of course, the endless drive member 146 will cause a shallow groove 148 to be formed in the surfaces of the ice 128 defining the recess 130 and the drive member 146 will be substantially entirely disposed within this shallow groove. Of course, the wall 136 forms a water shield preventing water thrown from the drive member 146 from escaping from within the housing 112.

A source of electrical potential is generally referred to by the reference numeral 150 and comprises a pair of batteries 152 supported from a mount 154 therefor secured to the top wall 136 in any convenient manner. Of course, the batteries 152 are electrically connected with each other and to the electric motor 140 in any convenient manner such as by a suitable electrical circuit (not shown) having a control switch 156 operatively disposed therein.

Operation of the apparatus 110 is substantially identical to the apparatus 10 in that actuation of the electric motor 140 will cause rotation of the container 132. Should one end of the container 132 be disposed lower than the other end as illustrated in FIGURE 6 of the drawings, the top wall 136 may be shifted to the phantom line position so as to maintain the endless flexible drive member in a plane disposed substantially normal to the longitudinal centerline of the container 132. However, the shallow groove 148 in the ice 128 also resists any tendency of the drive member 146 to "creep" toward one end of the container 132.

It may be seen from FIGURES 4–6 of the drawings that the plan shape of the housing 112 is slightly larger than and complementary to the plan shape of the container 132. This of course assists in preventing excess horizontal shifting of the ice 128. In addition, lateral and longitudinal shifting of the container 132 is limited by the close positioning of the walls 114–120 relative to the adjacent portions of the container 132.

With attention now invited more specifically to FIGURE 7 of the drawings, there may be seen a further modified form of apparatus generally referred to by the reference numeral 210 and which also includes an open top housing generally referred to by the reference numeral 212 corresponding to the housing 112. The housing 212 does not include a top wall inasmuch as it is quite shallow and the upper peripheral portions of the associated container 232 project above the upper edges of the side walls of the housing 212 but instead includes an extension 216' of one side wall 216 corresponding to the side wall 116. Instead of the electric motor 240 corresponding to the motor 140 being supported from a top wall, the motor 240 is supported from an upper portion of the extension 216' and its output shaft 242 is therefore positioned in general vertical alignment with the longitudinal center axis of the container 232. Accordingly, the endless flexible drive member 246 corresponding to the drive member 146 may be readily entrained over the pulley 244 corresponding to the pulley 144 and beneath the container 232.

Accordingly, it may be seen that the operation of the apparatus 210 is substantially identical to the operation of the apparatus 110 except that the motor 240 may not be readily shifted longitudinally of the axis of rotation of the container 232.

Of course, the recesses formed in the ice cradling the corresponding container may be formed in crushed ice by pushing the container partially into the ice. Additionally, if the ice comprises block ice, the recess may be formed by allowing the warmer container to cause the ice to melt so as to form the desired recess. It should also be noted that the rate of cooling of the container may be speeded up slightly in the modified forms of the invention illustrated in FIGS. 4–7 by placing additional ice on top of the corresponding container.

Further, the housings 112 and 212 are constructed of a material having heat insulating properties whereby the containers 132 and 232 may be stored therein for reasonably extended periods after being cooled. Finally, friction strips 160 of suitable material having a relatively high coefficient of surface friction are secured to the upper edges of the side walls 114 and 116 in any convenient manner for frictional engagement with the notched portions 138 of the top panel 136 thereby serving to frictionally retain the top panel 136 in adjusted position. Of course, the strips 160 could be secured to the top panel 136 and frictionally engaged with the upper edges of the side walls 114 and 116.

With attention now invited more specifically to FIGS. 8–10 of the drawings, there may be seen still another modified form of apparatus generally referred to by the reference numeral 310 including a housing generally referred to by the reference numeral 312 having opposite side walls 314 and 316, a pair of opposite end walls 318 and 320, and a bottom wall 322. The housing 312 may be identical to the housing 112 except that a top panel or wall corresponding to the wall 136 is not provided for the housing 312.

Instead, an electric motor and battery pack assembly generally referred to by the reference numeral 350 is provided and includes an electric motor 340 and a battery pack generally referred to by the reference numeral 352. The assembly 350 is supported between a pair of generally circular support discs 355 having a plurality of circumferentially spaced notches 357 formed therein with the output shaft 342 of the motor 340 eccentrically disposed relative to the center of the support discs 355. A container 332 may be rotatably cradled in the ice 328 disposed within the housing 312 and portions of the ice 328 may also be disposed above the container 332 so as to maintain a greater percentage of the exterior surfaces of the container 332 in contact with the ice 328. The endless flexible member 346 corresponding to the endless flexible member 146 is then entrained about the container 332 and the pulley 344 mounted on the output shaft 342 whereupon actuation of the electric motor 340 will cause the container 332 to be rapidly rotated while in contact with the ice 328.

From a comparison of FIGS. 9 and 10 of the drawings, it may be readily seen that the support discs 355 may be rotated relative to the housing 312 so as to adjustably vary the axis of rotation of the output shaft 342 in elevation relative to the bottom wall 322 of the housing 312. Thus, the endless flexible drive member 346 may be properly tensioned in substantially all instances even though the axis of rotation of the container 332 may be appreciably varied in elevation.

With attention now invited more specifically to FIGS. 11–13, there will be seen a still further modified form of the apparatus generally referred to by the reference numeral 410 and including a housing generally referred to by the reference numeral 412 which comprises a substantial duplicate of the housing 212 and includes an extension 416' corresponding to the extension 216' but notched as at 419 along its upper edge portion to form a pair of upwardly projecting arm portions 421 and 423. The apparatus 410 includes a motor and power pack assembly generally referred to by the reference numeral 450 corresponding to the assembly 350 and including an electric motor 440 and a power pack assembly generally referred to by the reference numeral 452. The motor 440 includes an output shaft 442 on which a drive pulley or wheel 444 is mounted and the battery pack 452 includes a sleeve portion 455 which rotatably receives a support rod 457 secured to the upper ends of the arm portions 421 and 423 by means of suitable wire fasteners 459. The fasteners 459 are generally U-shaped in configuration and embracingly engage the upper surface portions of the opposite ends of the support rod 457 and include laterally directed end portions 461 which extend through suitable apertures 463 provided therefor in the extension 416'.

Additionally, the battery pack 452 includes a second sleeve portion 465 in which a rod 467 is rotatably received, one end portion of the rod 467 having an elongated wire-like arm 469 secured thereto, the free end of the arm 469 having a plurality of bends therein forming steps or notches 471 which may be selectively engaged with the upper edge portion of the front wall of the housing 412 so as to adjustably vary the elevation of the output shaft 442 relative to the bottom of the housing 412. Further, a spray shield generally referred to by the reference numeral 473 is provided and includes a panel-like body 475 suitably apertured as at 477 to rotatably receive the output shaft 442. The body 475 includes an arcuate flange portion 479 against which water flown from the endless flexible drive member 469 is adapted to strike.

It is believed that it may be readily seen that the apparatuses 310 and 410 each operates generally in the same manner as the apparatuses 10, 110 and 210 but that in the apparatuses 310 and 410 the axis of rotation of the corresponding motor output shafts may be adjustably varied in elevation relative to the corresponding housing. Further, it is believed readily apparent that the sleeve or sleeve portion 455 also slidably receives the support rod 457 and therefore that the assemblies 350 and 450 may each also be slid longitudinally of the corresponding housings 312 and 412 in a similar manner and for the same purpose that the assembly comprising the top wall 136, the motor 140 and the source 150 is mounted for longitudinal shifting relative to the corresponding housing 112.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. An apparatus for rapidly cooling canned materials, said apparatus including support means, a quantity of ice disposed on said support means, a generally horizontally disposed and cylindrical container disposed on and cradled by said ice for rotation about its longitudinal axis, a pair of guide means supported from said support means on opposite sides of a vertical plane in which said axis is disposed, a flexible drive member guidingly engaging said guide means, said guide means being spaced along a line disposed generally normal to said axis and relative to said support means in a manner causing the reach of said drive member extending between said guide means to be laterally deflected by and disposed in driving frictional engagement with the upper portions of said container cradled in said ice whereby said container may be rotated in contact with and relative to said ice upon longitudinal movement of said drive member between said guide means.

2. An apparatus for rapidly cooling canned materials, said apparatus including support means thereon adapted to stationarily support a quantity of ice and defining a generally horizontal centerline, a pair of guide means supported from said support means on opposite sides of a vertical plane in which said centerline is disposed, and an elastic endless and flexible drive member guidingly engaging said guide means, said guide means being spaced along a line disposed generally normal to said centerline and relative to said support means in a manner adapted to cause a tensioned reach of said drive member extending between said guide means to be laterally deflected by and disposed in driving frictional engagement with the upper portions of a horizontally disposed generally cylindrical container cradled in said quantity of ice for rotation about an axis generally paralleling said centerline, whereby said container may be rotated in contact with and relative to said ice upon longitudinal movement of said drive member between said guide means, said guide means comprising flanged wheels journaled for rotation about axes generally paralleling said axis, water catching and collecting means including portions operatively supported adjacent said guide means in position to catch and collect water thrown from the portions of said drive member engaged with said guide means.

3. An apparatus for rapidly cooling canned materials, said apparatus including support means adapted to stationarily support a quantity of ice thereon and defining a generally horizontal centerline, a pair of guide means supported from said support means on opposite sides of a vertical plane in which said centerline is disposed, an endless and flexible drive member guidingly engaging said guide means, said guide means being spaced along a line disposed generally normal to said centerline and relative to said support means in a manner adapted to cause a tensioned reach of said drive member extending between said guide means to be laterally deflected by and disposed in driving frictional engagement with the upper portions of a horizontally disposed generally cylindrical container cradled in said quantity of ice for rotation about an axis generally paralleling said centerline whereby said container may be rotated in contact with and relative to said ice upon longitudinal movement of said drive member between said guide means, said guide means comprising flanged wheels journaled for rotation about axes generally paralleling said axis.

4. The combination of claim 3 wherein said guide means comprise castor wheel assemblies supported at opposite sides of said support means, said assemblies each including a supporting shank portion disposed at generally right angles relative to the axis of rotation of the corresponding flanged wheel, one of said shank portions being generally horizontally disposed and extending transversely of the axis of rotation of said drive wheel means, said support means including means supporting said one shank portion for adjustable positioning about its longitudinal axis.

5. The combination of claim 4 wherein said support means also includes means supporting said one shank portion for adjustable positioning longitudinally of its longitudinal axis.

6. An apparatus for rapidly cooling canned materials, said apparatus including support means adapted to stationarily support a quantity of ice and drive means including an elongated elastic and flexible endless drive member for drivingly rotating a generally horizontally disposed and cylindrical container of the material to be cooled, cradled in said ice, and journaled thereby, said support means including guide means spaced apart so as to be disposed on opposite sides of said ice and at an elevation no higher than said ice and guidingly receiving said drive member, and drive wheel means journaled from said support means and about which said drive member is entrained, the reach of said drive member extending between said guide means being adapted to be entrained over and frictionally drivingly engaged with said container with the portion of said drive member extending between said guide means being outwardly deflected by said container.

7. The combination of claim 6 wherein said guide means comprise flanged wheels journaled for rotation about axes generally paralleling said axis.

8. The combination of claim 7 wherein said guide means comprise castor wheel assemblies supported at opposite sides of said support means, said assemblies each including a supporting shank portion disposed at generally right angles relative to the axis of rotation of the corresponding flanged wheel, one of said shank portions being generally horizontally disposed and extending transversely of the axis of rotation of said drive wheel means, said support means including means supporting said one shank portion for adjustable rotated positioning about its longitudinal axis.

9. The combination of claim 8 wherein said support means also includes means supporting said one shank portion for adjustable positioning longitudinally of its longitudinal axis.

10. An apparatus for rapidly cooling canned materials, said apparatus including support means adapted to stationarily support a quantity of ice thereon and defining a generally horizontal centerline, a pair of guide means supported from said support means on opposite sides of a vertical plane in which said centerline is disposed, an endless and flexible drive member guidingly engaging said guide means, said guide means being spaced along a line disposed generally normal to said centerline and relative to said support means in a manner adapted to cause a tensioned reach of said drive member extending between said guide means to be laterally deflected by and disposed in driving frictional engagement with the upper portions of a horizontally disposed generally cylindrical container cradled in said quantity of ice for rotation about an axis generally paralleling said centerline whereby said container may be rotated in contact with and relative to said ice upon longitudinal movement of said drive member between said guide means, water catching and collecting means including portions operatively supported adjacent said guide means in position to catch and collect water thrown from the portions of said drive member engaged with said guide means.

11. In combination, support means, a quantity of ice supported from said support means, a generally cylindrical container inclined relative to a vertical position so as to be more horizontally disposed than vertically disposed and positioned on said ice and cradled thereby for primary support therefrom and for rotation of said container about its longitudinal axis relative to said ice, a rotatable drive shaft journalled from said support means, an endless flexible and elastic drive member entrained about said shaft and about said container in an at least partially tensioned condition thereby drivingly connecting said shaft to said container.

12. The combination of claim 11 wherein substantially all of said endless drive member lies in a plane disposed generally normal to the longitudinal centerline of said container.

13. The combination of claim 11 wherein said drive shaft generally parallels and is spaced vertically above said longitudinal axis and said drive member passes beneath said container between the latter and the confronting surfaces of said ice.

14. The combination of claim 11 wherein said support means comprises an open top receptacle including a bottom on which said ice is disposed, said receptacle including an upper portion disposed above said ice from which said drive shaft is supported.

15. The combination of claim 14 wherein said upper portion comprises an upper portion of an upstanding panel defining one side wall of said receptacle.

16. The combination of claim 11 wherein said support means comprises an open top receptacle including a bottom on which said ice is disposed, said receptacle including an upper portion disposed above said ice from which said drive shaft is supported, said upper portion comprising a closure panel removably positioned over the open top of said receptacle and from whose undersurface said drive shaft is dependingly journalled.

17. The combination of claim 16 wherein said closure panel is supported from the top of said receptacle for adjustable shifting longitudinally of the axis of rotation of said container.

18. In combination, a quantity of ice having a partial cylindrical and generally horizontally disposed upwardly opening semi-cylindrical recess formed therein, a drive shaft journalled for rotation about an axis stationarily positioned relative to said ice, an endless flexible and elastic drive member entrained about said drive shaft, a generally horizontally disposed cylindrical container cradled and journalled in said recess for primary support of said container from said ice, said drive member also being entrained about said container and being at least partially tensioned.

19. The combination of claim 26 including support means operatively supporting said rotatable drive shaft for lateral shifting relative to said chilled surface.

20. The combination of claim 19 wherein said endless friction drive member is elastic and therefore may have the tension thereof adjusted by laterally shifting said shaft relative to said chilled surface.

21. The combination of claim 18 including support means operatively supporting said rotatable drive shaft for lateral shifting relative to said ice.

22. The combination of claim 21 wherein said support means also includes means supporting said rotatable drive shaft for axial shifting relative to said ice.

23. The combination of claim 18 including support means operatively supporting said rotatable drive shaft for lateral swinging movement about an axis generally paralleling said shaft and laterally spaced relative to said container.

24. The combination of claim 23 wherein said support means includes means operative to releasably retain said drive shaft in adjusted swung positions.

25. The combination of claim 11 wherein said support means includes means defining a pair of upwardly facing generally parallel support edges, a pair of axially spaced generally circular support discs, said shaft being journalled for rotation relative to said discs about an axis disposed generally normal to and extending between said discs and eccentrically disposed relative to said discs, said discs being greater in diameter than the distance between said support edges and including corresponding circumferentially spaced outwardly opening notches of which corresponding selected pairs of notches removably seatingly receive said edges.

26. In combination, a container containing a substance therein to be cooled and having a generally cylindrical surface portion, a body including a chilled surface upon which said container is disposed for relative movement and primary support and guiding of said container from and during movement relative to said chilled surface, said container disposed in surface to surface contact with the chilled surface and resting upon the chilled surface for movement relative thereto, motion imparting means including a rotatable drive shaft and an endless friction drive member, said friction drive member being entrained about the drive shaft and directly frictionally engaged with the container so as to provide relative rotation between the container and the chilled surface.

References Cited by the Examiner

UNITED STATES PATENTS

| 779,962 | 1/1905 | Nobis | 165—80 X |
|---|---|---|---|
| 1,822,124 | 9/1931 | Birdseye | 62—63 X |
| 2,477,992 | 8/1949 | Leonard | 62—63 |
| 2,512,095 | 6/1950 | Endsley | 259—89 |
| 2,655,007 | 10/1953 | Lazar | 62—381 X |
| 3,187,803 | 8/1965 | Mundt | 165—6 |

ROBERT A. O'LEARY, *Primary Examiner.*

W. E. WAYNER, *Assistant Examiner.*